United States Patent
Grüning et al.

[11] Patent Number: 5,987,208
[45] Date of Patent: Nov. 16, 1999

[54] OPTICAL STRUCTURE AND METHOD FOR ITS PRODUCTION

[75] Inventors: Ulrike Grüning; Volker Lehmann, both of München, Germany

[73] Assignee: Siemens Aktiengesellschaft, Munich, Germany

[21] Appl. No.: 08/983,435

[22] PCT Filed: Jul. 11, 1996

[86] PCT No.: PCT/DE96/01256

§ 371 Date: Jan. 7, 1998

§ 102(e) Date: Jan. 7, 1998

[87] PCT Pub. No.: WO97/04340

PCT Pub. Date: Feb. 6, 1997

[30] Foreign Application Priority Data

Jul. 21, 1995 [DE] Germany ............. 195 26 734

[51] Int. Cl.[6] .................................................. G02B 6/10
[52] U.S. Cl. ........................................ 385/146; 385/129
[58] Field of Search .................................... 385/129, 146

[56] References Cited

U.S. PATENT DOCUMENTS 5,187,461  2/1993  Brommer et al. .
5,262,021  11/1993  Lehmann et al. .
5,403,752  4/1995  Bruchhaus et al. .

OTHER PUBLICATIONS

Grüning et al, "Two–dimensional infrared photonic band gap structure based on porous silicon", *Applied Physics Letter*, vol. 66, No. 24, Jun. 12, 1995, pp. 3254–3256.

Yablonovitch, "Photonic Band Structure", *Photonic Band Gaps and Localization*, Edited by C.M. Soukoulis, Plenum Press, New York, 1993, pp. 207–234.

Gourley et al, "Optical properties of two–dimensional photonic lattices fabricated as honeycomb nanostructures in compound semiconductors", *Applied Physics Letters*, vol. 64, No. 6, Feb. 7, 1994, pp. 687–689.

Krauss et al, "Fabrication of 2–D photonic bandgap structures in GaAs/AlGaAs", *Electronics Letters*, vol. 30, No. 17, Aug. 18, 1994, pp. 1444–1446.

Meade et al, "Novel applications of photonic band gap materials: Low–loss bends and high Q cavities", *Journal of Applied Physics*, vol. 75, No. 9, May 1, 1994, pp. 4753–4755.

*Primary Examiner*—Rodney Bovernick
*Assistant Examiner*—Robert E. Wise
*Attorney, Agent, or Firm*—Hill & Simpson

[57] ABSTRACT

An optical structure which is suitable as an optical waveguide or cavity comprises a carrier having a lattice structure with a photonic band gap and a defect region. The lattice structure comprises pores which have constriction and are arranged in a periodic grid pattern which is disturbed in the defect region. The optical structure can be produced by the electrochemical etching of silicon.

11 Claims, 4 Drawing Sheets

OPTICAL STRUCTURE AND METHOD FOR ITS PRODUCTION

BACKGROUND OF THE INVENTION

In optical waveguides, which for example, are used for optical data transmission, and cavities, which, for example, are used on laser resonators, the propagation of light is limited in at least two spatial directions. In this case, the wave guidance usually takes place by total reflection at the interface between an optically denser and an optically less dense medium. The light propagates in the optically denser medium in this case.

Recent scientific papers are concerned with the propagation of light in periodic dielectric lattice structures. The propagation of light in structures of this type can be described analogously to the propagation of electrons in a crystal. If the wavelength of the light is of the order of magnitude of the dimensions of the lattice, then a photonic band gap can form. The photonic band gap is a frequency range in which photons cannot propagate. This means that if light at a frequency which lies in the frequency range of the photonic band gap is radiated onto a structure of this type, then this light cannot propagate in the structure. Instead, it is reflected at the surface. This effect has been confirmed by experiments (see, for example, an article by E. Yablonovich, "Photonic Band Gaps and Localization", ed. C. M. Soukoulis, Plenum, New York, 1993, pages 207 to 234, or an article by U. Grüning et al., Appl. Phys. Lett., Vol. 66, No. 24, 1995, pages 3254 to 3256). This reflection is also referred to as a Bragg reflection at the dielectric lattice.

The experimental investigations were carried out on structures in which the lattice structure is realized as a layer structure having alternating layers with a different refractive index or from a nonmetallic material such as, for example, AlGaAs or GaAs or Si having pores arranged in a periodic grid pattern. In AlGaAs and GaAs, these pores are produced by reactive ion etching. In silicon, these pores have been produced by electrochemical etching.

On the basis of theoretical considerations and calculations, it has been proposed to utilize the effect of the Bragg reflection at the dielectric lattice for the purpose of realizing cavities and optical waveguides (see, for example, an article by R. Maede et al., J. Appl. Phys., Vol. 75, No. 9, 1994, page 4753). In this case, two regions made of a material having a photonic band gap are used for an optical waveguide. GaAs with a periodic hole structure has been proposed as a material for the photonic band gap. As the optical waveguide, the starting material, GaAs, without hole structures is arranged between the two regions. In this optical waveguide, light having a wavelength which corresponds to a frequency in the photonic band gap is guided in a plane by virtue of the fact that it cannot propagate into the material having the photonic band gap. In the plane perpendicular to this, the light is guided by total reflection at the interface between the optically denser GaAs and the surrounding, optically less dense atmosphere. In order to realize a cavity, material having a photonic band gap is provided for the purpose of limiting the propagation of the light in the third spatial direction.

SUMMARY OF THE INVENTION

The invention is based on the problem of specifying a further optical structure which is suitable as an optical waveguide or cavity and in which the light propagation is prevented in at least one spatial direction by means of the Bragg reflection at the dielectric lattice. Furthermore, it is intended to specify a method for producing such an optical structure.

This problem is solved according to the invention by means of an optical structure having a carrier with a main surface and a lattice structure with a defect region, said lattice structure being formed by pores extending perpendicular to said main surface and being arranged in a periodic grid pattern outside of said defect region and said grid pattern being disturbed in said defect region, said lattice structure having at least one frequency band for light in which light of a frequency of said band will not propagate in the lattice structure, said lattice structure having at least three regions arranged one above the other and extending parallel to said main surface, with the diameter of the pores in the second or middle region being smaller than the diameter of the pores in the outer or first and third regions.

To form the optical structure, the invention includes a method which comprises the steps of providing an n-doped silicon carrier having a main surface, forming a periodic grid pattern with a defect region of depressions in the main surface of the silicon carrier, and then electrochemically etching with at least three steps at the depressions of the main surface with the main surface in contact with an electrolyte and the silicon carrier being connected as an anode and an etching rate being influenced by a setting of a current density with an etching of a first value of current density for a first etching step to start etching a pore for each depression with a first region, etching at a second value of current density to form a second region of each pore and then etching at a third value of current density to form a third region for each pore, with the second value of the current density being less than the first and third values.

Further refinements of the invention emerge from the remaining claims.

In the optical structure according to the invention, a lattice structure is provided in a carrier. Any material which is not metallic and does not absorb the light with which the optical structure is to be operated is suitable for the carrier. In particular, the carrier is realized from a III–V semiconductor or from silicon.

The lattice structure has a photonic band gap, that is to say it has the property that there is at least one frequency band such that light at a frequency from this frequency band cannot propagate in the lattice structure. The lattice structure constitutes a dielectric lattice at which this light undergoes the Bragg reflection.

The lattice structure is formed by an arrangement of pores which run essentially perpendicular to a main surface of the carrier and have an essentially identical cross section. The cross section of the pores is preferably round, but may also be angular, for example square. Outside a defect region in the lattice structure, the pores are arranged in a periodic grid pattern. In the defect region, on the other hand, the periodic grid pattern is disturbed. The disturbance may consist in an altered lattice spacing between at least two pores, in the absence of at least one pore or in at least one pore which either is filled with another material or has a different diameter.

The pores have a constriction in the direction extending perpendicular to the main surface. This means that there are three regions arranged one above the other and aligned essentially parallel to the main surface, and the diameter of the pores is smaller in the middle region than in the two outer regions. As a result of this variation of the diameter of the pores, the dielectric constant and hence the refractive index the middle region differ from the dielectric constant and the refractive index in the outer regions. The middle region is thus optically denser than the outer regions. In the direction perpendicular to the main surface, light is therefore guided by total reflection at the interface between the middle region and the outer regions. Perpendicularly to this, the light is guided by virtue of the fact that it cannot propagate into the lattice structure on account of its wavelength, since the lattice structure has a photonic band gap for this wavelength. In the optical structure according to the invention, the light is guided in the carrier below the main surface.

The form of the optical waveguide or the cavity is determined by the geometrical form of the defect region. A cavity is formed by the defect region being bounded by the lattice structure in two directions of the main surface. For an optical waveguide, the defect region is extended further, with the result that the lattice structure is subdivided into two parts. In this case, the optical waveguide may run straight or be angular.

The light guided in the defect region can be finely tuned with regard to its wavelength and/or mode by way of the dimensioning of the defect region perpendicularly to the propagation of the light. The narrower the defect region is, the more distinct the selection of the guided light is with regard to frequency and mode.

It lies within the scope of the invention for the pores in the carrier to have more than one constriction. Two or more optical waveguides or cavities, which run one above the other, are realized as a result.

Further properties of the optical structure can be established by way of the form of the periodic grid pattern. If the periodic grid pattern is square, then the optical structure is suitable for guiding polarized light. This case results in the formation of photonic band gaps for the two polarization directions of the light which do not overlap. If, on the other hand, the grid pattern is trigonal, then the photonic band gaps for the two polarization directions of the light overlap and the optical structure is suitable for wave guidance of unpolarized light.

The optical structure can be produced by stacking differently structured layers one on the other. It can, furthermore, be formed by anisotropic etching in a substrate, the etching being carried out from two opposite surfaces. The constricted region is realized using a spacer technology, for example.

The optical structure is preferably produced on the basis of n-doped silicon by means of electrochemical etching. In this case, depressions arranged in a periodic grid pattern are first of all produced in a main surface of an n-doped silicon substrate. The grid pattern has a defect region in which at least one depression is absent. The electrochemical etching is carried out in an electrolyte which preferably contains fluoride and is acidic and with which the main surface is in contact. A voltage is applied between the electrolyte and the silicon substrate, with the result that the silicon substrate is connected up as an anode. As a result, minority charge carriers in the n-doped silicon move to the main surface which is in contact with the electrolyte. A space charge zone is formed at this main surface. Since the field strength is greater in the region of depressions in the main surface than outside said region, the minority charge carriers preferably move to these points. This results in self-aligned structuring of the surface. The deeper an initially small depression becomes as a result of the etching, the more minority charge carriers move there owing to the increased field strength, and the greater the etching attack is at this point. The pores grow as the etching time lengthens.

The etching attack depends on the current density in the silicon substrate. By increasing the current density in the electrolyte, the etching attack is increased and the cross section of the pore is thus enlarged. The etching is carried out in at least three etching steps in the method according to the invention. Etching is carried out with a first value for the current density in the first etching step, etching is carried out with a second value for the current density in a second etching step and etching is carried out with a third value for the current density in a third etching step. In this case, the second value for the current density in the second etching step is smaller than the first value for the current density in the first etching step and the third value for the current density in the third etching step. As a result, the pores are formed with a constriction. The constriction is effected by the smaller, second value for the current density.

In order to produce the optical structure with pores which have two or more constrictions, the electrochemical etching is correspondingly carried out in five or more etching steps.

DESCRIPTION OF THE PREFERRED EMBODIMENTS

Figure 1:
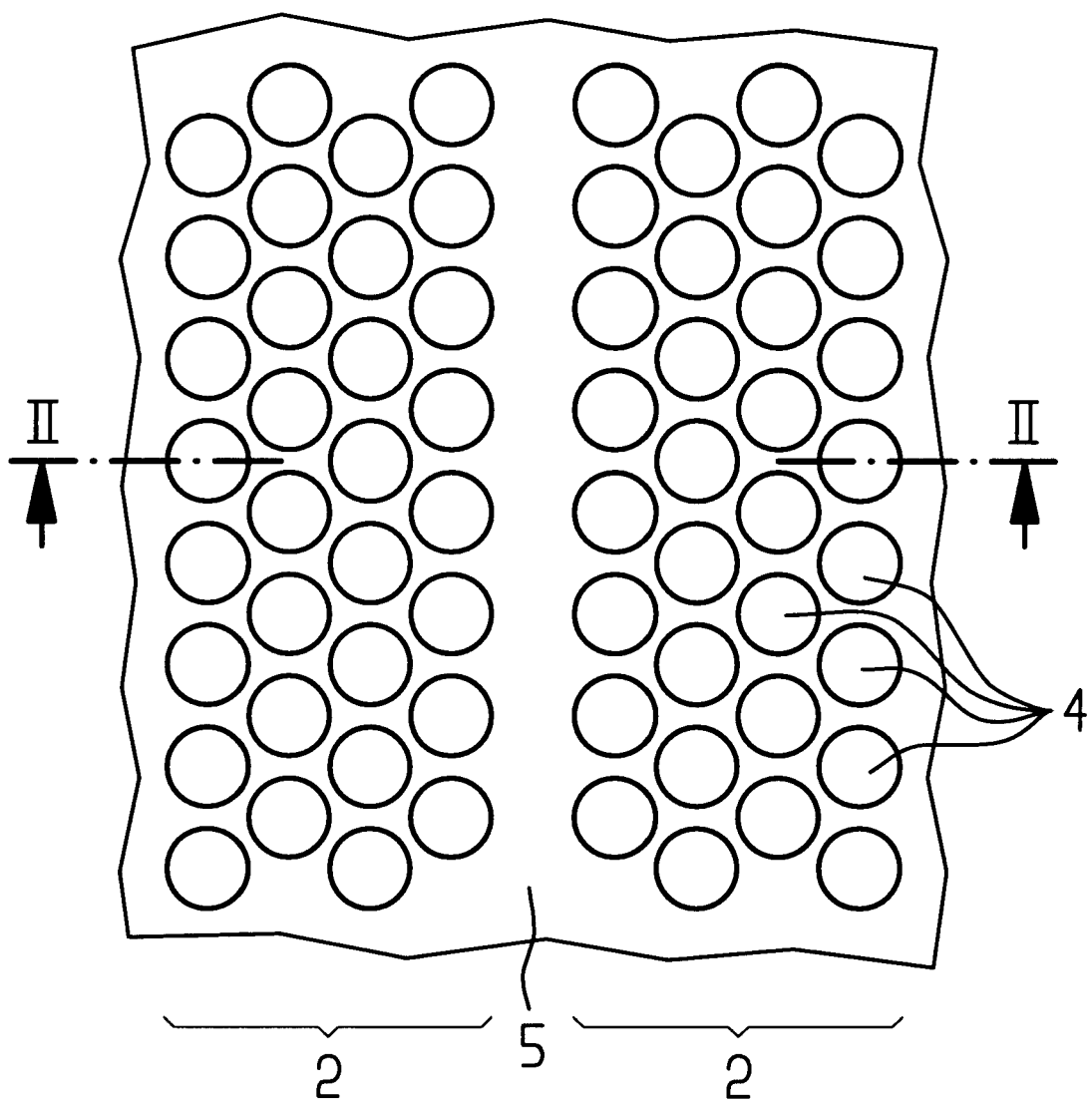
FIG. 1 is a plan view of an optical structure having an optical waveguide.
Figure 2:
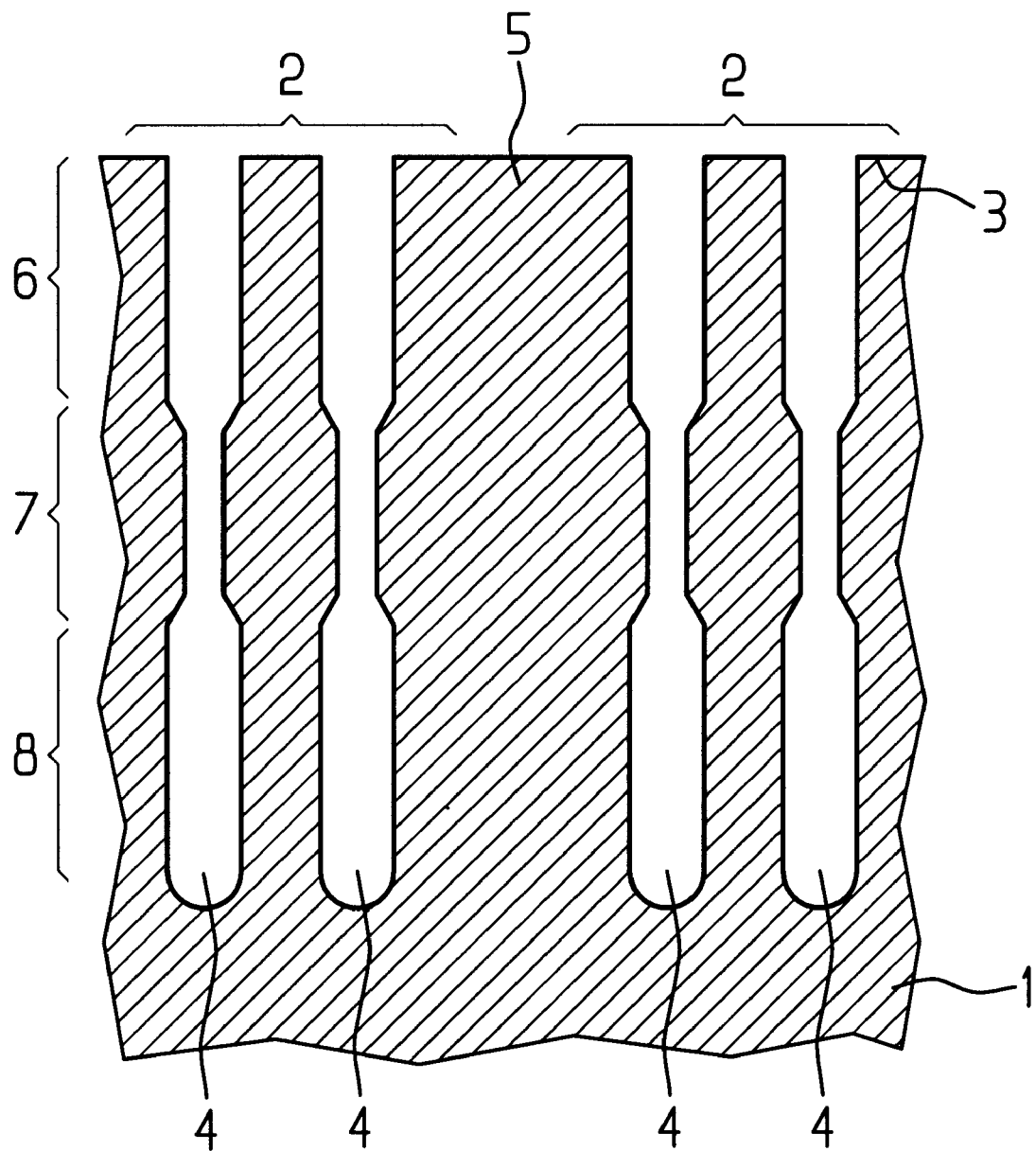
FIG. 2 is a cross-sectional view through the optical structure having the optical waveguide which view is taken along line II—II of FIG. 1.

A carrier 1 made of n-doped, monocrystalline silicon comprises a lattice structure 2 (see FIG. 1 and FIG. 2). The lattice structure 2 is formed by a periodic arrangement of pores 4 which run essentially perpendicular to a main surface 3 of the carrier 1 and have an essentially round cross section. In the lattice structure 2, there is a defect region 5 in which the periodic grid pattern is disturbed by virtue of the fact that no pores 4 are arranged in this region. The width of the defect region 5 is equal to the extent of one pore 4, for example.

The pores 4 are arranged in a trigonal grid pattern, for example. The wavelength range of the light for which wave guidance occurs in the defect region 5 is in this case set by way of the distance between neighboring pores 4. The relationship $a/\lambda \approx 0.2$ to $0.5$ is generally true for the distance a between the center points of neighboring pores and the wavelength $\lambda$. By a corresponding arrangement of the pores in the grid pattern, the wavelength of the guided light can be shifted through the entire wavelength range in which the material of the carrier 1 does not absorb. In the example where the carrier 1 is composed of silicon, this means that wave guidance can be set reliably in the wavelength range between 1.1 $\mu$m and 100 $\mu$m. For wave guidance in the wavelength range from 5 to 6 $\mu$m, the distance between neighboring pores 4 is a=1.5 $\mu$m to 2.5 $\mu$m.

In a first region 6, which extends from the main surface 3 down into the carrier 1, the pores 4 have a diameter of, for example, 2.2 $\mu$m with a distance between neighboring pores 4 of a=2.3 $\mu$m. In a second region 7, which is arranged underneath the first region 6, the pores 4 have a diameter of, for example, 2.0 $\mu$m, which is smaller than the diameter of the pores in the first region 6. In a third region 8, which is arranged underneath the second region 7, the pores 4 have a diameter of, for example, 2.2 μm, which is a larger diameter than the diameter of the pores in the second region 7. The pores 4 do not have a constant diameter throughout their depth, with the result that a constriction of the pores 4 occurs in the second region 7.

The effect of this constriction of the pores 4 is that more silicon is present in the second region 7 than either in the first region 6 or in the third region 8. The second region 7 therefore constitutes a denser medium in comparison with the first region 6 and with the third region 8.

Light having a wavelength λ which lies in the photonic band gap of the lattice structure 2 is guided in the plane perpendicular to the main surface 3 by virtue of the fact that it cannot propagate in the lattice structure 2 on account of the photonic band gap. In the direction perpendicular to this plane and parallel to the surface 3, this light is guided by total reflection at the interfaces of the second region 7 with the first region 6 and with the third region 8. The sectional region formed by the defect region 5 and the second region 7 acts as an optical waveguide.

In order to produce the optical structure, depressions are produced in the main surface 3 of the carrier 1, which has a resistivity of 1 Ω cm, for example, which depressions are arranged in a periodic grid pattern corresponding to the pores 4. No depressions are produced in the region of the defect region 5.

The depressions are produced, for example, after the production of a photoresist mask with the aid of conventional photolithography and subsequent alkaline etching.

After the photoresist mask has been removed, the main surface 3 of the carrier 1 is brought into contact with a fluoride-containing, acidic electrolyte. The electrolyte has a hydrofluoric acid concentration of 1 to 50 percent by weight, preferably 3 percent by weight. An oxidizing agent, for example hydrogen peroxide, can be added to the electrolyte in order to suppress the evolution of hydrogen bubbles on the main surface 3 of the carrier 1.

The carrier 1 is connected up as an anode. A voltage of 0 to 20 volts, preferably 3 volts, is applied between the carrier 1 and the electrolyte. The carrier 1 is illuminated with light from a rear side opposite to the main surface 3, with the result that a current density of, for example, 18 mA/cm$^2$ is set. Starting from the depressions, the pores 4 which run or extend perpendicular to the main surface 3 are produced during the electrochemical etching.

After an etching time of, for example, 10 minutes, during which the current density was set to be constant at the first value of 18 mA/cm$^2$, the pores reach a depth of 10 μm, for example. The current density is then reduced to a second value of, for example, 14 mA/cm$^2$ and the electrochemical etching is continued at this value. In the process, the pores 4 grow further with a reduced diameter. The second region 7 of the pores 4 is formed. After an etching time of, for example, 5 minutes, the second region 7 of the pores 4 has a dimension perpendicular to the main surface 3 of 5 μm, for example. The current density is then increased to a third value of, for example, 18 mA/cm$^2$ and the electrochemical etching is continued. In the process, the third region 8 of the pores 4 is produced, in which region the diameter of the pores 4 is greater than the diameter of the pores 4 in the second region 7. After an etching time of, for example, 10 minutes, the third region 8 has an extent perpendicular to the main surface 3 of 10 μm, for example. The optical structure is thus completed.

A periodic lattice structure 2' is provided in a carrier 1', which, like the carrier 1, is composed of n-doped, monocrystalline silicon. The periodic lattice structure 2' has a photonic band gap for light having the wavelength λ. The lattice structure 2' is produced by pores 4' formed in a main surface 3' of the carrier 1' (see FIG. 3 and FIG. 4).

The center points of the pores 4' are arranged in a periodic, trigonal grid pattern. In this case, the distance a between neighboring center points of the pores 4' satisfies the condition a/λ≈0.2 to 0.5. Owing to this dimension, the lattice structure 2' has a photonic band gap for light having the wavelength λ. In this case, for example, a=2.3 μm and λ=5 μm.

A defect region 5', in which the periodic grid pattern is disturbed by virtue of the fact that a pore 4' is absent, is provided in the lattice structure 2'. Light having the wavelength λ cannot propagate in the defect region 5' parallel to the main surface 3', since the propagation of the light having the wavelength λ is impossible in the lattice structure 2' owing to the photonic band gap of the surrounding lattice structure 2'.

The pores 4' do not have a constant diameter throughout their depth. In a first region 6', which adjoins the main surface 3', the pores have a diameter of 2.2 μm, for example. In a second region 7', which is arranged underneath the first region 6', the pores have a smaller diameter of 2.0 μm, for example. In a third region 8', which is arranged underneath the second region 7', the pores have a diameter of 2.2 μm, for example. In a fourth region 9', which is arranged underneath the third region 8', the pores have a smaller diameter of 2.0 μm, for example. In a fifth region 10', which is arranged underneath the fourth region 9', the pores have a diameter of 2.2 μm, for example. The depth of the first region 6' is, for example, 10 μm, the depth of the second region 7' is 5 μm, the depth of the third region 8' is 20 μm, the depth of the fourth region 9' is 5 μm and the depth of the fifth region 10' is 10 μm.

The cross section of the pores 4' has a constriction both in the second region 7' and in the fourth region 9'. As a result, there is more silicon present both in the second region 7' and in the fourth region 9' than in the adjoining first region 6', third region 8' and fifth region 10'. The second region 7' and the fourth region 9' therefore constitutes an optically denser medium than the respectively adjoining regions 6', 8', 10'.

Light having the wavelength λ, which is prevented from propagating in the defect region 5' in the extent parallel to the main surface 3' by means of the surrounding lattice structure 2', is held in the direction perpendicular to the main surface 3' by total reflection at the interface with the optically less dense medium in the second region 7' and in the fourth region 9'. The sectional region between the defect region 5' and the second region 7' as well as between the defect region 5' and the fourth region 9' in each case constitutes a cavity.

Figure 3:
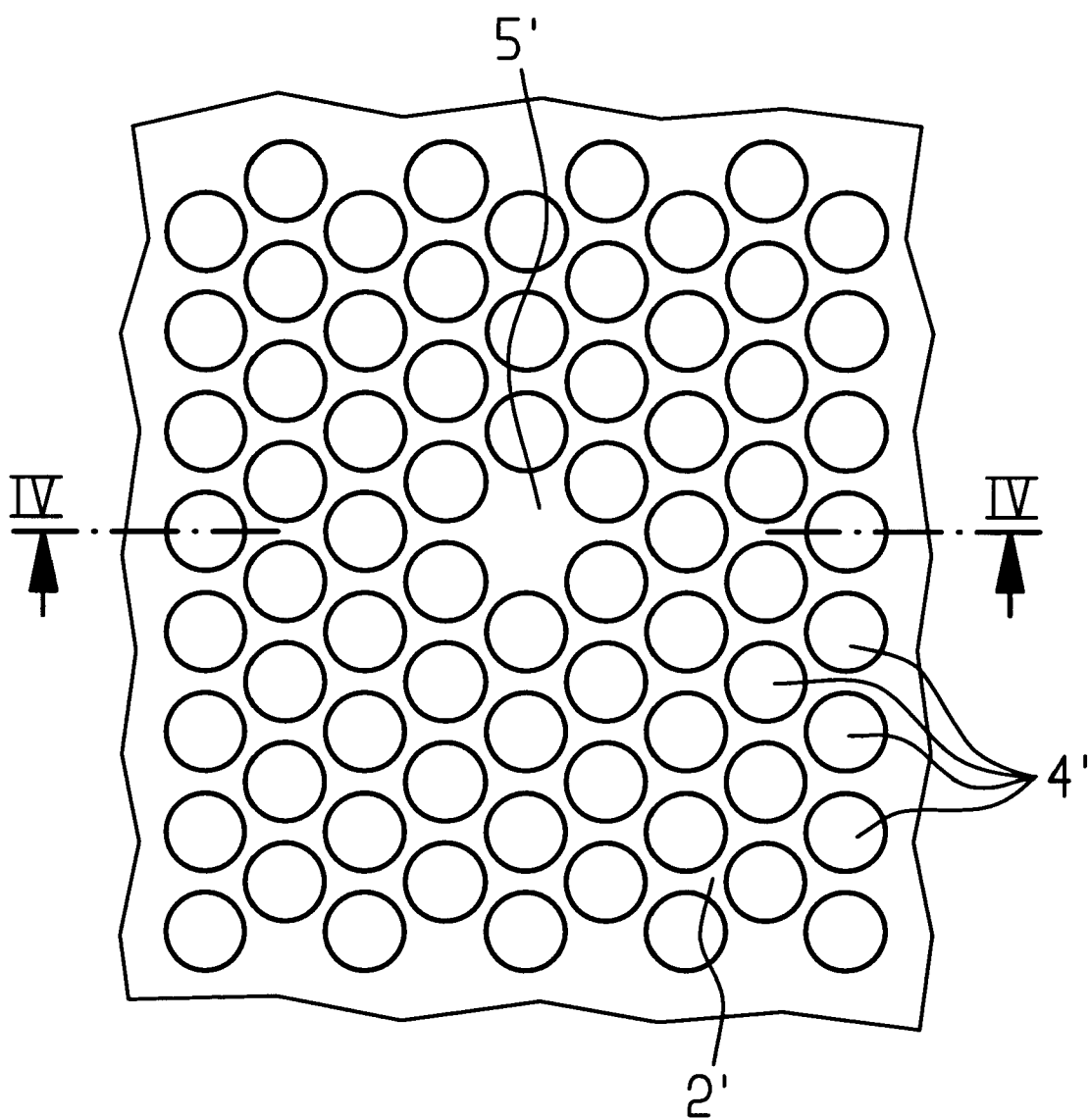
FIG. 3 is a plan view of an optical structure having at least one cavity.
Figure 4:
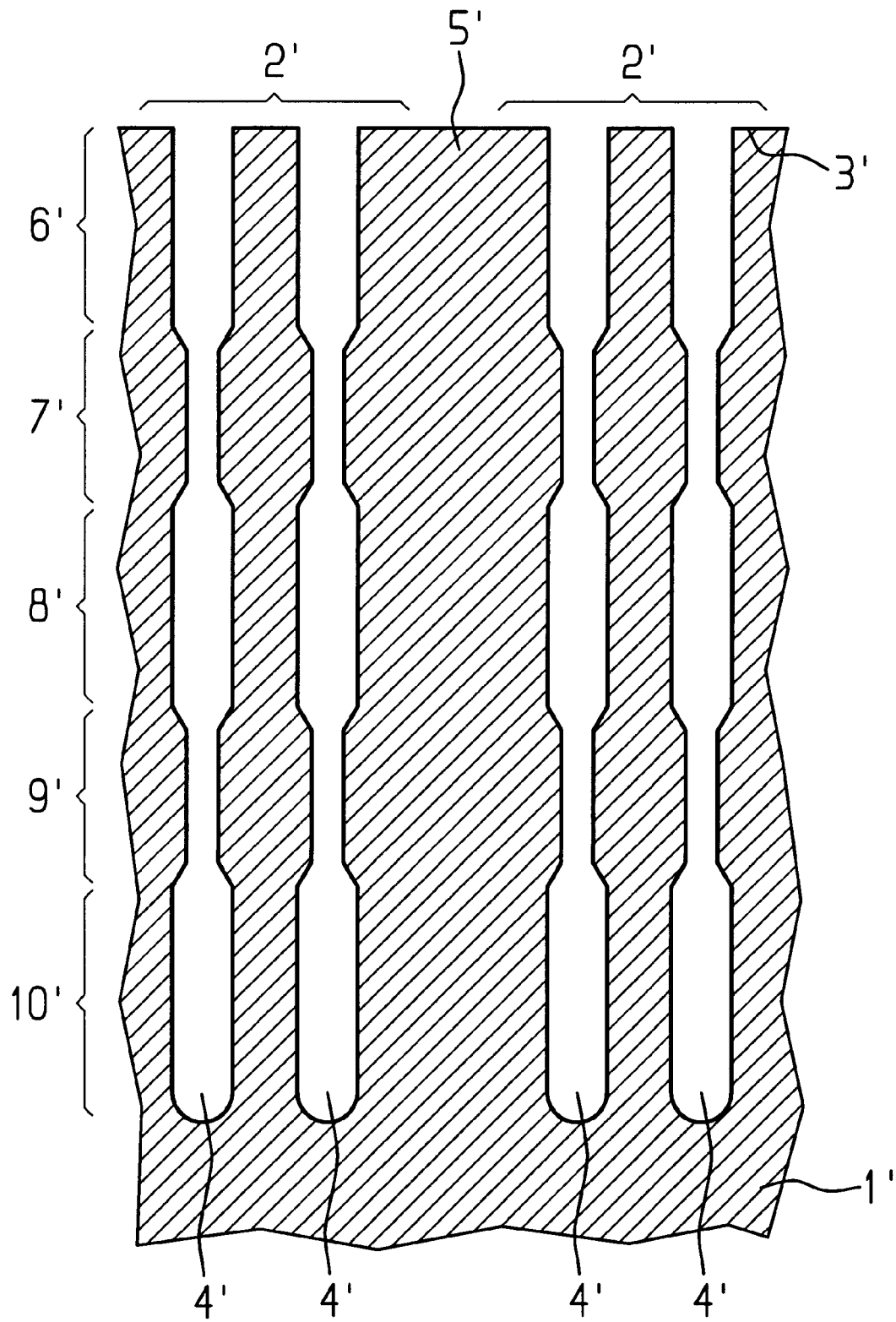
FIG. 4 is a cross-sectional view through the optical structure which view is taken along line IV—IV in FIG. 3, and shows the pores having two constrictions.

The production of the optical structure which has been explained with reference to FIG. 3 and FIG. 4 is carried out in a manner analogous to the production of the optical structure which was explained with reference to FIG. 1 and FIG. 2, by electrochemical etching. In order to form the fourth region 9' and the fifth region 10' of the pores 4', in this case the electrochemical etching is continued further, the current density for etching the fourth region 9' being set to the second value, which was used for etching the second region 7', and the current density for etching the fifth region 10' being set to the third value, which was used for etching the third region 8.

The invention can be applied analogously to optical structures in which more than two optical waveguides or cavities are arranged one above the other. For this purpose, the number of constrictions of the pores is correspondingly increased.

We claim:

1. An optical structure comprising a carrier with a main surface and a lattice structure with a defect region, said lattice structure being formed by pores extending perpendicular to said main structure and being arranged in a periodic grid pattern outside of said defect region and siad grid pattern being disturbed in said defect region, said lattice structure having at least one frequency band for light in which light of a frequency of said band will not propagate in the lattice structure, said lattice structure having at least a first, second and third region being arranged one above the other and extending parallel to said main surface with the diameter of the pores in the second region being smaller than the diameter of the pores in the first and third regions.

2. An optical structure as claimed in claim 1, in which the defect region subdivides the lattice structure into at least two parts in the region of the main surface.

3. An optical structure as claimed in claim 1, in which at least one further region is provided underneath the third region, the further region having a pore diameter smaller than the pore diameter in the region above and below the further region.

4. An optical structure as claimed in claim 1, wherein the carrier is composed of silicon.

5. An optical structure as claimed in claim 4, wherein the distance between the center points of neighboring pores lies in the range between 0.5 $\mu$m and 25 $\mu$m, wherein the diameter of the pores in the second region lies in the range between 0.4 $\mu$m and 23 $\mu$m, wherein the diameter of the pores in the first region and in the third region lies in the range between 0.45 $\mu$m and 24.5 $\mu$m, and wherein the extent of the second region perpendicular to the main surface is between 1 $\mu$m and 50 $\mu$m.

6. An optical structure as claimed in claim 1, wherein the grid pattern is trigonal.

7. A method for forming an optical structure, said method comprises the steps of providing an n-doped silicon carrier having a main surface, forming a periodic grid pattern of depressions in the main surface of the silicon carrier with a defect region in the pattern, electrochemically etching with at least three steps the main surface of the carrier with the main surface being in contact with an electrolyte and the silicon carrier being connected as an anode and an etching rate being influenced by setting of a current density, etching at a first value of current density for a first etching step to start etching a pore at each depression to form a first region for each pore, then etching at a second value of a current density to form a second region of each pore and then etching at a third value of a current density to form a third region for each pore, with the second value of the current density being less than the first and third values so that the second region of each pore has a smaller diameter than the pore in the first and third regions.

8. A method as claimed in claim 7, wherein the current density is set by illuminating a rear side, opposite to the main surface of the silicon carrier.

9. A method as claimed in claim 8, wherein the silicon carrier is a <100> wafer, and the electrochemical etching is carried out in a fluoride-containing, acidic electrolyte.

10. A method as claimed in claim 7, wherein the depressions in the main surface are produced by providing a photoresist mask on the main surface and subsequently carrying out an alkaline etching of the main surface.

11. A method according to claim 7, wherein the silicon carrier is a <100> wafer, and the electrolyte is a fluoride-containing, acidic electrolyte.

* * * * *